No. 820,897.
PATENTED MAY 15, 1906.
J. W. WHITAKER.
COFFEE AND TEA POT.
APPLICATION FILED JULY 17, 1905.
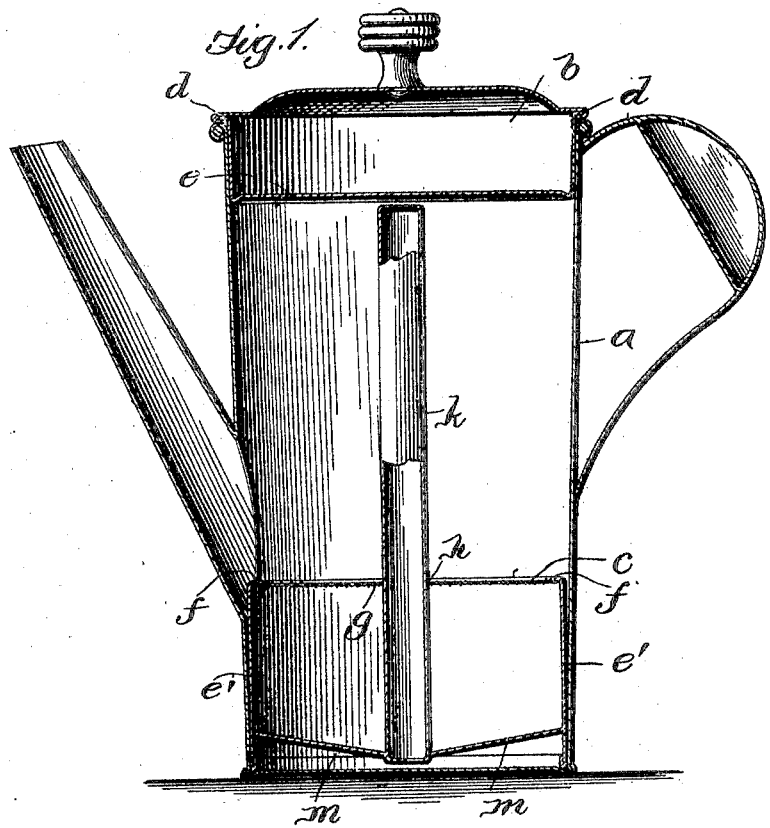
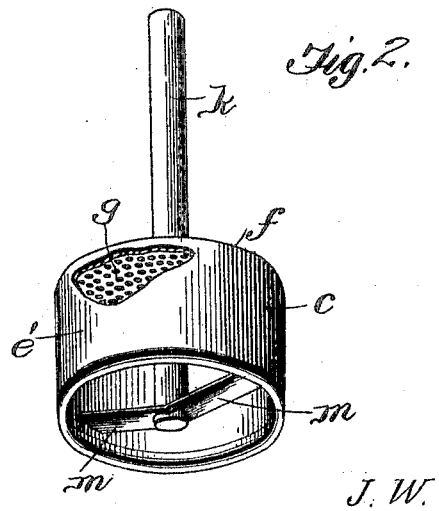
Witnesses
P. A. Boswell
George M. Anderson
Inventor
J. W. Whitaker
By E. W. Anderson
his Attorney

UNITED STATES PATENT OFFICE.

JOSEPH W. WHITAKER, OF NOBLE, ILLINOIS.

COFFEE AND TEA POT.

No. 820,897.  Specification of Letters Patent.  Patented May 15, 1906.

Application filed July 17, 1905. Serial No. 270,022.

*To all whom it may concern:*

Be it known that I, JOSEPH W. WHITAKER, a citizen of the United States, and a resident of Noble, in the county of Richland and State of Illinois, have made a certain new and useful Invention in Coffee and Tea Pots; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a central vertical section of the invention with parts broken away. Fig. 2 is a perspective detail view of the strainer device, partly broken away.

The invention relates to pots for preparing coffee or tea; and the invention consists in the novel construction and combination of devices, as hereinafter set forth.

In the accompanying drawings, illustrating the invention, the letter $a$ designates the body of the pot, and $b$ the cover. The body of the pot is cylindrical in appearance, but is slightly tapering from the top toward the bottom, in order to provide for a close fit of an inner strainer device $c$. It is an inverted conical frustum having the elemental lines of its wall at a slight angle from the vertical. The cover is designed to be seated in the mouth of the pot and is usually of a depth of about three-quarters of an inch below the flange $d$. The cover has a bottom $e$ inclosing the hollow chamber thereof which forms an air-chamber, serving to prevent undue radiation of heat.

The removable open bottom or thimble-strainer device $c$ consists of a cylinder-wall $e$ of proper diameter and contour to fit closely within the wall of the pot when pressed down to the bottom thereof. The upper edge of the cylinder, which is usually about one-third the height of the pot, is bent inward to provide a narrow flange $f$, to which is secured the perforated or wire-cloth strainer-diaphragm $g$, which is formed with a central seat $h$ for the vertical tubular depressor-handle $k$, which is closed at top and bottom. This handle is secured to the strainer and is braced at its lower end by arms $m$, which are secured to said lower end and to the inside surface of the cylinder-wall $e$. These arms are designed to have a somewhat oblique position, being inclined upward and outward from the bottom of the handle-tube to the wall $e$, so that the lower edge portion of the wall is not obstructed thereby. The tubular post and the arms $m$ are designed to hold the strainer-diaphragm and the cylinder-wall firmly braced in relative position. The tubular handle is designed to be of proper height to have its upper end in contact or approximate contact with the bottom of the cover when the strainer device is pushed down to the bottom of the pot, and the cover is placed in position in the mouth thereof.

In using this pot the coffee or tea-leaves can be put in the strainer-cylinder and the pot pushed down over the same, or the coffee or tea-leaves can be put into the pot and the strainer device afterward pushed down into the pot over the contents. As the cylinder-wall $e$ fits the lower portion of the wall of the pot closely, it will collect and gather in all the coffee-grains or tea-leaves by means of its unobstructed lower edge portion and will hold them securely in the bottom of the pot. If tea is being used, hot water is then poured in for steeping and the cover placed in position, insuring that the strainer-thimble is at the bottom of the pot. If coffee is being made, water is poured in and the cover put in place, after which the contents are boiled if the coffee is to be made in that way, or, if preferred, a small quantity of boiling water is poured into the pot, which is then closed and allowed to stand for five minutes, after which the pot is filled up with the hot water and is ready for use. In any case there will be no floating grains or tea-leaves, and the coffee or tea can be poured out clear.

The pot is of simple construction and is easily cleaned as is the strainer. The cover has no recess to become soiled. The strainer is readily inserted and removed and is readily cleaned on account of its open bottom, and as it is thoroughly braced it is not liable to get out of shape, so that it will always fit neatly in the lower slightly-contracted portion of the pot.

Having described the invention, what I claim, and desire to secure by Letters Patent, is—

1. A coffee or tea pot consisting of a body portion having its wall slightly tapered toward its bottom, a cover, and a close-fitting open-bottom removable cylindriform collecting-holder having a strainer-top, a central bracing-handle extending through said top and holder, and bracing-arms connecting the handle and the peripheral walls of the holder at the bottom of the holder.

2. A coffee or tea pot consisting of a body portion having its wall slightly tapered toward its bottom, and a close-fitting open-bottom removable cylindriform collecting-holder having a strainer-top, a central bracing-handle extending through said top and holder, bracing-arms connecting the handle-bottom, and the bottom of the peripheral walls of the holder and a cover for said pot having a false bottom adapted to fit down close to the top of said handle to keep the holder in place.

In testimony whereof I affix my signature in presence of two witnesses.

JOSEPH W. WHITAKER.

Witnesses:
E. F. WALTERS,
ANNIE FOSTER.